United States Patent Office 3,079,352

Patented Feb. 26, 1963

3,079,352

PROTECTIVE COATING COMPOSITIONS FOR ETCHING FORMED FROM CHLOROPRENE POLYMER, CARBON BLACK AND PHENOL-ALDEHYDE RESIN, AND METAL SUBSTRATE COATED THEREWITH

Don C. Atkins, Jr., Whittier, and Richard V. Edds, Los Angeles, Calif., assignors, by mesne assignments, to Purex Corporation, Ltd., a corporation of California No Drawing. Filed Apr. 23, 1956, Ser. No. 579,717
8 Claims. (Cl. 260—3.5)

This invention relates to the coating or masking of the surfaces of objects and parts to protect such coated surfaces from chemical attack, particularly during chemical etching of the exposed uncovered surface portions of such objects. The invention is more particularly concerned with novel maskant compositions particularly adapted for use in chemical etching of metal parts.

In chemical etching, material or metal is removed from the surface of the part by treatment thereof in an etching solution to obtain a part having a desired structural or ornamental configuration. In many instances, in order to produce a desired etch configuration on an article in a practical manner, it is necessary to mask certain portions of the surface of the article so as to prevent contact of such surface portions by the etching solution.

A substantial number of organic compounds and resins have been employed as etch maskants by the prior art. These include vinyls, epoxy resins, silicones, polyamides, polyethylenes, and other chemical polymers. These materials, however, are unsatisfactory for a number of reasons, such as "cob-webbing" or the formation of thin strands of maskant composition between the application equipment and the part, even when said composition has proper solids content, failure of the mask formed by such compositions to withstand the environment of the etching solution, failure of the mask to adhere sufficiently to the substrate or surface of the part, difficulty in removing the mask after completion of the etching process, necessity for use of a primer prior to application of the mask, necessity for excersing extreme care in cleaning prior to the application of the mask, limited pot life of the maskant composition after addition of the accelerator (in the case of those masks requiring an accelerator), necessity of excessive heat treatment in order to complete the curing cycle, necessity for using masking tape and non-reproducibility with respect to general characteristics affecting the operation of the mask.

Of the above noted disadvantages, the most serious problems encountered in the use of prior art maskants are (1) insufficient adhesion of the mask to the part, (2) insufficient resistance of the mask to the etching solution especially at the edges of the mask, permitting undesirable penetration of the solution between the mask and underlying substrate, (3) inability to be readily strippable from the part after etching, and (4) excessive "cob-webbing" which often accompanies spraying of the maskant composition onto the part.

One object of this invention is the provision of novel plastic coating compositions forming coatings resistant to chemical attack.

Another object of this invention is the provision of novel maskant compositions avoiding the above noted difficulties of the prior art.

A further object of the invention is to provide an article having applied to at least a portion of the surface thereof, a novel maskant composition for protection of such surface portion from attack by an etching solution during etching of said article.

A still further object is to provide a novel maskant composition which on application to the surface of a part to be etched forms a mask or plastic coating preventing corrosion of the surface portion covered by said mask, by the etching solution, such mask being resistant to attack by the etching solution particularly at the edges of the mask, said mask in addition being uniformly adherent to the substrate before and after etching yet readily cuttable and strippable from the substrate both prior to and following etching.

Yet another object is the provision of relatively inexpensive maskant compositions and coatings for masking parts to be subjected to chemical etching and the coated article.

Other objects and advantages will be apparent from the following description of the invention.

We have found that the limitations and disadvantages of prior art maskant compositions are avoided by our novel composition, which is a mixture of certain synthetic rubbers, resins, fillers, retarders and solvent, and which preferably includes accelerators, the individual components of the composition being present in amounts within certain ranges set out more fully hereinafter.

The essential active ingredients of our maskant composition are a chloroprene polymer, carbon black and phenolic resin, the amount of chloroprene polymer and phenolic resin being properly balanced, as pointed out more fully hereinafter. In certain instances chlorinated natural rubber can be included in our composition, although this is not an essential ingredient. To the invention composition is generally added an antioxidant and a accelerator to augment and complete the curing of the mask after application of the maskant composition to the surface of a metal part. The accelerator can be added to the above noted maskant composition just prior to applying such composition to the substrate, but preferably and as a particular advantage of the invention, the accelerator can be incorporated into the maskant composition substantially prior to use thereof, and the resulting composition permitted to stand for relatively long periods at normal temperature without resulting in any appreciable curing or "setting up" of the maskant composition prior to use.

In one form of the invention a maskant composition is formed including a chloroprene polymer, chlorinated natural rubber, phenolic resin, carbon black, antioxidant and solvent, in certain preferred proportions set out below, and an accelerator composition including as essential accelerator component an aldehyde-amine condensate, is added to the aforementioned maskant composition prior to application thereof to a substrate.

In another form of the invention a maskant composition is formed including chloroprene polymer, phenolic resin, carbon black, antioxidant, accelerator and solvent, these ingredients being present in certain preferred proportions. A portion of the carbon black of the latter composition may be replaced by chlorinated natural rubber. These compositions are storable prior to use even though the accelerator has been added thereto.

The mask formed by the maskant compositions of the invention has the characteristics of (*a*) being impermeable to the etching solutions and (*b*) adhering at a controlled, or controllable, degree of adhesion sufficient to cause it to adhere to the substrate under the severe conditions of the etching bath; namely, at elevated temperature and/or high chemical activity, but which is nevertheless readily removable by hand stripping both before and after etching, yet having, on portions hand stripped prior to etching, adequate adherence to the part surface at the cut edges of the mask. The invention maskant compositions also possess the advantages of being applicable to the part surface without "cob-webbing," and of being highly inert to chemical etching solutions.

However, the strippable nature of the mask and its chemical resistance to attack by etching solutions, are outstanding properties of the mask produced herein, making such mask particularly adaptable and useful in connection wth metal removal by means of etching solutions so as to form structural parts which may have relatively complex configurations. The strippable nature of this mask makes it possible to spray, dip, or brush a coating of our novel maskant composition on a substrate such as an aluminum alloy, and after curing the composition under conditions which do not require extremes of temperature or time to complete the curing cycle, the mask may be stripped from the substrate by cutting the mask with a sharp knife or similar instrument and pulling the cut mask from the surface by hand, either before or after etching. This property is of advantage since it is now possible to coat an entire surface with our mask and then remove the mask from the surface in stages following a plurality of successive etching operations, in accordance with a predetermined design. The area which is left masked at each stage is thus defined by sharp lines which are in exact accordance with the desired design. Furthermore, this new mask possesses sufficient adhesion such that the boundary between the masked and unmasked area is sharp and definitive even after completion of etching. It is not necessary to perform any additional operation to insure the adhesion of the mask at the boundary between the masked and unmasked areas. Also, employing our maskant composition a design can be cut in the mask, the part etched to a desired amount, another design cut in the mask and etching continued. In this manner our mask now makes it possible to prepare multiple cuts (or etch levels) by chemical etching without the necessity for completely demasking the part after each etching step and remasking to a new design. The saving in labor and expense is accordingly substantial. Further, the mask can be stripped by hand after completion of etching without resorting to the use of special demasking agents. However, our maskant composition is also removable by treatment with known demasking materials, should such an operation be desired.

We have found that to obtain the advantages of the invention, the maskant composition should contain by weight from about 5 to about 25% chloroprene polymer, about 3 to about 25% carbon black, less than 10% but not less than about 1% phenolic resin, desirably in the form of a phenolaldehyde resin. When the amount of chloroprene polymer employed is in the low portion of the above noted range for this material, the amount of phenolic resin used should also be in the low portion of the range, noted for this material, and when the chloroprene polymer used is in the high portion of its above noted range, the phenolic resin is also utilized in an amount in the high portion of its range set out above. Preferably the composition should also contain about .08 to about 0.6% antioxidant and an amount of accelerator composition ranging from about 0.1% to about 3% by weight of the total maskant composition. The composition may also contain from about 1 to about 10% chlorinated natural rubber if desired, although this ingredient is not essential. The organic solvent constituting the remainder of the maskant composition is generally employed in an amount of from about 50% to about 90% by weight of the maskant composition.

In our invention it is noted that to the chloroprene polymer, which acts as the impermeable material, there is added a phenolic resin in the proper amount to give the adhesion desired. For a particular chloroprene polymer or mixtures thereof, the use of too much phenolic resin will normally cause too much adherence so that the material cannot be properly hand stripped, and conversely use of too little phenolic resin will result in too little adhesion to the substrate so that the mask may fail during the etching process by the etchant creeping beneath the mask. We have found that the use of chloroprene polymer and phenolic resin in the above noted range produces proper adhesion.

It will be understood that the amount of phenolic resin actually used in a given case will depend on several factors. These include the type of alloy to which the maskant composition is to be applied, the condition of the surface of such alloy, the type and amount of chloroprene polymer employed in the maskant composition, and also the amounts and relative proportions of the other components of the maskant composition, as well as the specific compounds constituting said other components. We have found that while the use of less than 10% of phenolic resin is necessary to obtain the improved results of the invention, an amount of about 1% to about 5% of phenolic resin, by weight of the maskant composition is preferred, and produces best results in most instances.

A specific feature obtained by the controlled degree of adhesion is the obtaining of the desired adherence of the mask at the interface following removal of a portion of the mask prior to etching, and during the etching operation.

As the chloroprene polymer component, we prefer to employ the materials known as "neoprene AC" (non-sulfur modified chloroprene polymer stabilized by a thiuram disulfide) and "neoprene KNR" (sulfur-modified chloroprene polymer stabilized by a thiuram disulfide), both marketed by the Du Pont Company. However, other chloroprene polymers may also be employed. Neoprene AC has the following properties:

| | |
|---|---|
| Specific gravity | 1.23. |
| Appearance | Light cream to light green. |
| Odor | None. |
| Plasticity | Soft grade: Can be dissolved without milling. Medium and hard grades: Not soluble without premastication. |
| Solubility | Readily soluble in aromatic hydrocarbons, such as toluene; chlorinated compounds such as carbon tetrachloride; and certain ketones such as methyl ethyl ketone. It is insoluble in aliphatic hydrocarbons, water, alcohol and acetone. |

Neoprene KNR has the following properties:

| | |
|---|---|
| Specific gravity | 1.23. |
| Appearance | Amber-colored. |
| Odor | None. |
| Plasticity | Easily plasticized to a putty-like consistency. |
| Solubility | Has limited solubility before plasticizing after which it is readily soluble in aromatic and chlorinated hydrocarbons and naphthenic petroleum solvents. It is insoluble in aliphatic hydrocarbons, water, alcohol and partially soluble in esters and ketones. |

Neoprene AC is generally harder than neoprene KNR.

As the carbon black component, we prefer to employ the material known as "Thermax" and marketed by the R. T. Vanderbilt Co., but we can also employ other carbon blacks such as "carbon black SRF," marketed by the Witco Chemical Co. "Thermax" has the following properties:

| | |
|---|---|
| Composition | Medium thermal carbon. |
| Specific gravity | 1.80. |
| Color | Dark gray. |
| pH | 7.2–7.4. |
| Particle size | 470–500 mμ. |
| Properties | Mixes easily with low heat generation. |

"Carbon black SRF" has the following properties:

| | |
|---|---|
| Composition | Semireinforcing furnace black. |
| Color | Blue gray. |
| pH | 9.2–9.6. |
| Average particle size | 160–200 mμ. |

The carbon black serves as a filler to improve the tensile strength properties of the mask produced by my maskant composition.

The phenolic resin preferably is of the phenol-aldehyde type, e.g. phenol-formaldehyde resin, and we prefer to use the product designated "Resin CKR 1634" (p-tertiary butyl phenol-formaldehyde resin), marketed by Bakelite Chemical Co. The latter material has a specific gravity of 1.11, a melting point of 190–215° F., has 100% nonvolatiles and an acid number of 52–82.

Representative of the chlorinated natural rubber which we may employ is "Parlon," C.P. stabilized, marketed by Hercules Powder Co. The properties of this material are as follows:

| | |
|---|---|
| Color of film | Water-white. |
| Odor | None. |
| Specific gravity | 1.64. |
| Index of refraction | 1.554. |
| Tensile strength, pounds per sq. inch, dry | 4,270. |
| Tensile strength, pounds per sq. inch, wet | 4,100. |
| Modulus of elasticity, pounds per sq. inch | $1.4\times10^5$. |
| Burning rate | Non-flammable. |
| Softening point (unstabilized) | Decomposes at 135° C. to 150° C. |
| Moisture absorption at 80% relative humidity in 24 hours, percent | 0.27. |
| Resistance to | |
| Acids, weak | Excellent. |
| Acids, strong | Do. |
| Alkalies, weak | Do. |
| Alkalies, strong | Do. |

As antioxidant we prefer to use phenyl-alpha naphthyl amine, which has no effect on the rate of cure of the rubber regardless of the accelerator used. As rubber accelerator we prefer to employ a butyraldehyde-monobutylamine condensation product such as "Accelerator 833," marketed by Du Pont, which is in the form of a nontoxic translucent amber colored liquid having a specific gravity of 0.86. As an activator for this accelerator we preferably employ litharge (lead monoxide). As an additional component of the accelerator composition for accelerating curing particularly of the phenolic resin, we prefer to employ magnesium oxide. When the latter compound is employed, we have found from experience that a quantity not much more than about 0.4% by weight of the composition should be employed, since undesirable flocculation of the maskant composition in the solvent may occur using percentages greater than about 0.4%. However, equivalent materials for those mentioned above may be employed. The solvent utilized in our maskant composition can be an aromatic solvent, such as toluene and petroleum aromatics, methyl ethyl ketone, and the like, or mixtures thereof, toluene being preferred.

The components of our maskant composition may be mixed or blended in any desired manner. For example, a preferred mode of preparing the composition including accelerator, is to first break down the nerve tissue of the chloroprene polymer or neoprene by milling a mixture of the neoprene, carbon black and magnesium oxide on suitable milling equipment, such as a Banbury mill. These well mixed materials are then dissolved in toluene. The remaining ingredients are added, preferably but not necessarily, in a toluene solution, to the toluene solution of carbon black, magnesium oxide, and neoprene. The final composition is in the form of a colloidal solution which is homogeneous and does not settle out.

The composition can be made in varying viscosity ranges depending particularly on the amount of solvent incorporated in the formulation and the relative proportions of chloroprene polymer or neoprene present, and the formulation can be stored or applied immediately to the surface of the article to be coated.

The above maskant composition can be applied to the substrate or metal surface in any suitable manner such as by spraying, brushing, flow coating, dipping, silk screening or any other conventional method for applying paints, lacquers or coatings. Although our novel maskant formulation is particularly suited for use on iluminum and its alloys as substrates, it is to be understood that such formulation can also be employed on other materials such as ferrous and other non-ferrous alloys to protect certain areas thereof from corrosion by etching solutions. Hence, the formulation is alkali resistant and is also resistant to non-oxidizing acids and to oxidizing acids when sufficiently dilute and at moderately elevated temperatures. In acid etchants such as HCl, the maskant is highly resistant to attack. As to its chemical resistance to $H_2SO_4$ and $HNO_3$ separately, the maskant is resistant at concentrations up to about 6 normal and up to about 150° F., while in $H_2SO_4$—$HNO_3$ or $HNO_3$—HCl mixtures the maskant is resistant up to concentrations of about 3 normal and temperatures up to about 100° F. The maskants hereof are likewise resistant to alkaline solutions, e.g. comprising caustic alkali or soda ash at concentrations up to about 10 normal and temperatures up to the boiling temperature of the solution.

After application of the maskant composition to the substrate, the plastic coating is cured by heating, e.g. at about 200–225° F., for from about one half to two hours, depending on the thickness of the coating or mask film. The mask is then cooled to room temperature either by allowing it to cool gradually or by immersion in cold water. The part is then treated with an etching solution to cause the uncovered or exposed surfaces of the part to be etched or corroded by the etching solution to the desired depth and to form the desired etch pattern or configuration. Generally the masking composition is initially applied to the entire surface of the part, and the mask cut and hand stripped in accordance with a pre-selected design, to uncover or expose a surface portion of the part corresponding to said design. This can be accomplished with or without a template.

Various types of etching solutions, acidic or alkaline, can be employed for etching the exposed surface of the part adjacent the mask, depending on the nature of the metal to be etched. For example, in the case of aluminum and its alloys, which are alkali soluble, a hot aqueous etching solution is generally employed containing an alkali such as sodium or potassium hydroxide, trisodium phosphate, soda ash or the like, or mixtures thereof, preferably sodium hydroxide solution. Temperature is generally maintained in a range say from 100° F. to about boiling, although lower temperatures can be used. Generally the alkali concentration employed in such solutions ranges from 0.1 to 10 normal.

It is noteworthy that the mask using our maskant compositions is highly resistant to alkaline and acid etchants, and forms a tight bond with the surface of the substrate substantially without the formation of capillary openings between the mask and the substrate or surface covered, especially at the edge of the mask. Due to this latter feature, etching solution is unable to pass into the interface between the substrate and the mask, and the mask is as resistant to etching solution along its edges as it is on its top surface. Another outstanding advantage of our mask is that while it is tightly adherent to the substrate and resistant to the etching solution as pointed out above, on completion of etching the mask is readily strippable from the substrate without the need for special stripping agents.

It is particularly significant that despite the fact that it would be expected that the presence of a phenol-aldehyde resin in the maskant compositions hereof would cause the mask to harden at high temperature in an alkali etchant solution, it has been dramatically found that the mask produced in accordance with the invention does not harden on contact with alkali etchant solutions at high temperatures, and retains its plasticity, adherence cuttability, and strippability during and after treatment of the part having a portion of its surface covered by such mask, in said solutions.

Particularly when aluminum or its alloys are to be coated with our maskant for etching, the metal surface is preferably cleaned. Ordinarily these metals contain a thin surface coating or film of oil with dirt particles in the oil film. Treatment of such surface with a mild alkaline cleaner such as a mixture of silicates, phosphates, soda ash, and wetting agents, marketed as a composition known as "Turco 4090" by Turco Products, Inc., of Los Angeles, California, removes this oil-dirt film. If the metal surface has grease thereon, this can be removed by treatment in a solvent such as tetrachloroethylene prior to treatment with the alkaline cleaner.

The following examples are illustrative of practice of the invention.

*Example 1*

A formulation is prepared consisting of the following ingredients in the proportions listed in column A. The second column sets forth a range of proportions of the ingredients which can be employed. The amounts are set forth in terms of percentage by weight.

| | A in percent | Range in percent |
|---|---|---|
| Neoprene AC | 9.6 | 5-15 |
| Neoprene KNR | 6.6 | 3-9 |
| Chlorinated natural rubber ("Parlon") | 4.5 | 2-6 |
| Phenolic resin (Resin CKR 1634) | 7.1 | 1-9 |
| Carbon black ("Thermax") | 9.1 | 5-15 |
| Phenyl-alpha naphthyl amine | 0.4 | 0.2-0.6 |
| Toluene | 62.7 | Remainder |
| | 100.0 | |

An accelerator composition is prepared consisting of the following ingredients in the proportions listed in column B, the second column setting forth a range of proportions of said ingredients, the quantities being expressed in percentage by weight.

| | B in percent | Range in percent |
|---|---|---|
| Magnesium oxide | 11.0 | 5-15 |
| Litharge | 14.0 | 10-20 |
| Aldehyde-amine condensate ("Accelerator 833") | 8.0 | 6-10 |
| Toluene | 67.0 | Remainder |
| | 100.0 | |

Composition B is mixed with composition A in a proportion of 4 parts of B to 100 parts of A to form a maskant composition C.

A 2024 aluminum alloy part is treated in non-corrosive alkaline cleaner in the form of a solution of Turco 4090, and the part rinsed in water. The maskant composition C consisting of the above mixture of compositions A and B is sprayed onto the surface of the aluminum alloy part to form a coating about 0.005 inch thick. The mask is then cured by heating between 200 and 225° F. for one-half to one hour. A design is cut into the surface of the mask, and the cut portion of the mask is removed by hand stripping, leaving an exposed surface portion corresponding to the design to be etched.

The part is then immersed in a 11% caustic alkali solution at a temperature of 190° F. After etching of the part to the desired depth in the unexposed areas, the part is removed from the solution. It is observed that the mask is still tightly bonded to the part surface and particularly that the edges of the mask are still clean and sharp with no noticeable etching deterioration thereof, and that such edges are tightly bonded to the substrate. The mask is then peeled from the substrate by first inserting a sharp edged instrument beneath an edge of the mask, the mask thereafter being readily peelable from the part surface.

*Example 2*

The same maskant composition is prepared as composition C in Example 1, except 0.2% phenolic resin (CKR 1634) is used instead of 7.1%, the difference in percentage being made up by increasing the toluene to 69.6%. After application to the parts and treatment as set forth in Example 1, the resulting mask is found to have insufficent adherence to the part, permitting the etching solution to penetrate beneath the mask at the cut edges.

*Example 3*

The same composition is prepared as composition C in Example 1, except 10% phenolic resin (CKR 1634) is used instead of 7.1%, the difference in percentage being made up by reducing the toluene to 59.8%. After application to the part and treatment as set forth in Example 1, the resulting mask is found to have excessive adhesion to the part, not allowing suitable peeling of desired portions of the mask from the part.

*Example 4*

A maskant formulation is prepared consisting of the following ingredients in the proportions listed in column D in percent by weight, the second column setting forth a range of proportions of ingredients which can be utilized.

| | D in percent | Range in percent |
|---|---|---|
| Neoprene KNR | 8.15 | 5-15 |
| Neoprene AC | 0.89 | 0-2 |
| Carbon Black SRF | 9.08 | 5-10 |
| Phenyl-alpha naphthyl amine | 0.16 | 0.08-0.3 |
| Phenolic resin (CKR 1634) | 2.57 | 1-5 |
| Chlorinated natural rubber ("Parlon") | 1.68 | 1-5 |
| Magnesium oxide | 0.19 | 0.1-0.4 |
| Aldehyde amine condensate ("Accelerator 833") | 0.13 | 0-0.2 |
| Litharge | 0.24 | 0.1-0.4 |
| Aromatic solvent (toluene) | 76.91 | Remainder |
| | 100.00 | |

A 2024 aluminum alloy plate is treated first in an alkaline cleaner and rised in a manner similar to that described in Example 1, and the part then dipped in the above maskant composition to attain the desired film thickness of maskant on the surface of the alloy plate. The maskant composition is then cured by heating the mask at 200 to 225° F. for one-half to two hours. A design is cut in the mask and a portion of the mask corresponding to this design peeled from the part surface.

The part is then immersed in a hot caustic alkali etching solution similar to that described in Example 1 for a period sufficient to produce the desired depth of etch in the exposed surface portions of the part not covered by the mask. As in the case of Example 1, following removal of the etched part from the solution, it is noted that the mask remains tightly adherent to the substrate, even at the mask edges, which remain sharp and clearly defined. The mask is then removed by peeling or stripping it from the part surface in a manner similar to that in Example 1, the mask being readily stripped from the part, leaving a sharply defined etch pattern in the part surface.

*Example 5*

A maskant composition is prepared consisting of the following ingredients in the proportions listed in column E in percent by weight, the second column setting forth a range of proportions of ingredients which can be utilized.

| | E in percent | Range in percent |
|---|---|---|
| Neoprene KNR | 16.90 | 14–20 |
| Carbon Black (Thermax) | 13.53 | 10–20 |
| Antioxidant (phenyl-alpha naphthyl amine) | 0.24 | 1.12–0.36 |
| Phenolic resin (CKR 1634) | 3.84 | 1–5 |
| Magnesium oxide | 0.4 | 0.10–0.40 |
| Aldehyde amine condensate ("Accelerator 833") | 0.20 | (1) 0.10–0.30 |
| Litharge | 0.44 | 0.20–0.60 |
| Aromatic solvent | 64.45 | Remainder |
| | 100.00 | |

[1] 0.40–1.3.

A 7075 aluminum alloy plate is treated first in an alkaline cleaner and rinsed in a manner similar to that described in Example 1, and the plate is dipped into the maskant composition E to cover certain surface portions of the alloy plate. The maskant composition is then cured by heating the mask at 200 to 225° F. for one-half to two hours. A design is cut in the mask and a portion of the mask corresponding to such design is peeled from the part surface.

The part is then immersed in a hot caustic alkali etching solution similar to that described in Example 1 for a period sufficient to produce the desired depth of etch in the exposed surface portions of the part not covered by the mask. As in the case of Example 1, following removal of the etched part from the solution, it is noted that the mask remains tightly adherent to the substrate, even at the mask edges, which remain sharp and clearly defined. The mask is then removed by peeling or stripping it from the part surfaces in a manner similar to that in Example 1, the mask being readily stripped from the part, leaving a sharply defined etch pattern in the part surface.

*Example 6*

A 1020 steel alloy is cleaned by treatment in Turco 4090 cleaner, and then rinsed.

The maskant composition E of Example 5 is sprayed onto the surface of the cleaned steel alloy and the mask is cured in a manner similar to that described in Example 5. A design is cut into the mask and the portion of the mask corresponding to said design is stripped, leaving certain portions of the part uncovered. The resulting article is then placed in an etching bath comprising a solution of nitric, hydrochloric and phosphoric acids at a temperature of 140° F.

Following removal of the etched part from the solution, it is noted that the mask remains tightly adherent to the substrate, even at the mask edges, which remain sharp and clearly defined. The mask is then removed by peeling or stripping it from the part surface in a manner similar to that in Example 1, the mask being readily stripped from the part, leaving a sharply defined etch pattern in the part surface.

*Example 7*

A FS–1 magnesium alloy is cleaned in a cleaner composed of a mixture of salts of phosphates, silicates, caustic soda and wetting agents. Maskant composition E of Example 5 is applied to the cleaned magnesium alloy in the same manner as in Example 6, a design cut in the mask and the cut portion is stripped from the surface of the part. The part is then etched in a dilute solution (5%) sulfuric acid at 70–100° F., and following etching, the mask is readily stripped from the part surface.

The masks formed in the above examples can be tested for peel adhesion by the following procedure:

A part is coated with the maskant composition to obtain a 5 mil etch film (.005") of dried coating. A strip of the coating one inch in width is partially stripped from the surface of the part, and the free end is placed in a clamp which is attached to a spring having an indicator calibrated in pounds of tension on the spring.

The free end of the strip of mask to which said clamp and spring are attached is then bent bask about 180°, with the bent back portion maintained above and parallel to the surface of the part. The strip is further peeled from the surface of the part by pulling on the spring, and the rate of peel is controlled to peel 5 inches of the strip per minute from the part surface. During this period of peeling of the strip and movement of the spring, the tension required to produce such peeling under these conditions is read from the indicator. The values thus obtained are in terms of pounds for a rate of 5 inches per minute of peeling of an inch strip of coating.

Under the above test procedure, a good maskant coat should have a peel adhesion test value of between 2.4 and 2.8 lbs. when the test is carried out at 25° C., in order that the coating be sufficiently adherent to the substrate, yet easily strippable therefrom. The peel adhesion test value of the coatings formed in Examples 1 and 4 to 7 are between 2.5 and 2.7 lbs., and hence have a good peel adhesion.

However, the peel adhesion value for the coating of Example 2 is on the order of but one and one-half lbs. This is too low a value, indicating that the mask is not properly adherent to the part.

On the other hand, the peel adhesion value for the coating of Example 3 is about 3 lbs. or more, which is too high, and indicates that the mask is too highly adherent to the part surface and hence does not have the proper peelability or strippability.

Another test procedure is to heat the part having the mask thereon, which mask is applied in the manner described above, in hot water at 190° F. for 30 minutes, and then carry out the test procedure as set out above.

Under these test conditions, a proper peel adhesion value should be between 1.5 and 1.9 lbs. The masks formed in Examples 1 and 4 to 7 have a value between 1.6 and 1.8 lbs. and hence have good peel adhesion characteristics under these test conditions, while the mask of Example 2 has a peel adhesion value on the order of 1.3 lbs. or less, indicating too little adhesion and thus undesirable, while the mask of Example 3 has a peel adhesion value of about 3 lbs., which is excessive and hence undesirable.

The compositions of the alloys employed in the examples are set out below:

2024 aluminum—91.5% Al, .5% Si, .5% Fe, 4.9% Cu, .2% Mn, .1% Cr, 1.7% Ni, .2% Zn, .5% Mg 7075 aluminum—90% Al, .5% Si, .7% Fe, 1.2% Cu, .3% Mn, .2% Cr, 5.2% Zn, 2% Mg 1020 steel—.22% carbon, .12% Mn, .01% P, .03% S, .01% Si FS–1 magnesium—95.5% Mg, 3% Al, .5% Mn, 1% Zn From the foregoing, it is seen that we have provided a novel maskant composition having outstanding properties and advantages, for use in preventing attack of the underlying surfaces of a part coated with said composition, during etching of said part. The maskant is easily prepared from readily available materials and can be stored without "setting up" even though it may contain an accelerator. The maskant composition can be readily dipped, sprayed or otherwise applied to the substrate without annoying "cob-webbing," and can be cured in a reasonably short period of time.

Of particular importance, the maskant snugly adheres to the surface of the substrate or coated part, and contains no open spaces between the mask and substrate, particularly at the edges of the mask, so that etching solution is unable to pass between the mask and underlying part surface to impair the quality of the desired etch pattern. The mask composition is further highly inert to corrosive alkaline and acid etching solutions, and is not eaten away, particularly at the mask edges, by such solutions. Also, the mask retains its plasticity, cuttability and strippability even after treatment with such corrosive solutions, and hence the mask is readily cuttable and strippable from the substrate subsequent to, as well as prior to, etching, to leave a clean sharply defined etch configuration.

While the maskant compositions hereof have particular utility for producing a mask on a part to be etched, it is to be understood that our maskant compositions can also be utilized to form protective, strippable plastic coatings on the surface of objects for protection generally of such surfaces from chemical attack, whether from etching solutions or other sources, for example, from the weather. Thus, the invention compositions are not limited for use in etching operations, but can be applied to surfaces of objects whenever it is desired to protect said surfaces from chemical attack, particularly by acids and alkalis.

While we have described a particular embodiment of our invention for the purpose of illustration, it should be understood that various modifications and adaptations thereof may be made within the spirit of the invention as set forth in the appended claims.

We claim:

1. A heat curable maskant composition adapted to form a plastic coating inert to acids and alkali, said composition consisting eseentially of the following ingredients by weight: from about 5 to about 25% of non-copolymerized chloroprene polymer, about 3 to about 25% carbon black, about 1 to about 5% of a phenol-form aldehyde resin, about .08 to about 0.6% alpha naphthyl amine as antioxidant, about 0.1% to about 3% of an accelerator composition consisting of a mixture of a butyraldehyde-monobutylamine condensation product, litharge and magnesium oxide, the remainder of said composition being an organic aromatic solvent.

2. A heat curable maskant composition adapted to form a plastic coating inert to acids and alkali, said composition consisting essentially of the following ingredients by weight: about 5 to about 25% of non-copolymerized chloroprene polymer, about 3 to about 25% carbon black, about 1 to about 5% of a phenol-formaldehyde resin, from about 1 to about 10% chlorinated natural rubber, about .08 to about 0.6% alpha naphthyl amine as antioxidant, about 0.1% to about 3% of an accelerator composition consisting essentially of a mixture of a butyraldehyde-monobutylamine condensation product, litharge and magnesium oxide, the remainder of said composition being an organic aromatic solvent.

3. A heat curable maskant composition adapted to form a plastic coating inert to acids and alkali, said composition consisting essentially of the following ingredients by weight: about 14 to about 20% of non-copolymerized chloroprene polymer, about 10 to about 20% carbon black, about 1 to about 5% of a phenol-formaldehyde resin, about 0.12 to about 0.36% effective antioxidant, about 0.40 to about 1.3% of an effective accelerator composition, the remainder of said composition being an organic aromatic solvent.

4. An article of manufacture which comprises an object having a metallic surface and a coating covering a portion of said surface, said coating being inert to attack by acids and alkali, said coating being obtained by heat curing a maskant composition consisting essentially of about 14 to about 20% of non-copolymerized chloroprene polymer, about 10 to about 20% carbon black, about 1 to about 5% of a phenol-formaldehyde resin, about 0.12 to about 0.36% antioxidant, about .40 to about 1.3% of an effective accelerator composition, the remainder of said maskant composition being an organic aromatic solvent.

5. An article of manufacture which comprises an object having a metallic surface and a coating covering a portion of said surface, said coating being inert to attack by acid and alkali, said coating being obtained by heat curing a maskant composition consisting essentially of about 14 to about 20% of non-copolymerized chloroprene polymer, about 10 to about 20% carbon black, about 1 to about 5% of a phenol-formaldehyde resin, about 0.12 to about 0.36% alpha naphthal amine as antioxidant, an accelerator composition consisting essentially of about 0.10 to about 0.40% of magnesium oxide, about 0.10 to about 0.30% butyraldehyde-monobutylamine condensation product and about 0.20 to about 0.60% litharge, the remainder of said maskant composition being an organic aromatic solvent.

6. A heat curable maskant composition adapted to form a plastic coating inert to acids and alkali, said composition consisting essentially of the following ingredients by weight: from about 5 to about 25% non-copolymerized chloroprene polymer, about 3 to about 25% carbon black, about 1 to about 5% of a phenol-formaldehyde resin, about .08 to about 0.6% phenyl-alpha naphthyl amine as antioxidant, about 0.1% to about 3% of an accelerator composition consisting of a mixture of a butyraldehyde-monobutylamine condensation product, litharge and magnesium oxide, the remainder of said composition being an organic aromatic solvent.

7. A heat curable maskant composition adapted to form a plastic coating inert to acids and alkali, said composition consisting essentially of the following ingredients by weight: about 5 to about 25% of non-copolymerized chloroprene polymer, about 3 to about 25% carbon black, about 1 to about 5% of a phenol-formaldehyde resin, from about 1 to about 10% chlorinated natural rubber, about .08 to about 0.6% phenyl-alpha naphthyl amine as antioxidant, about 0.1% to about 3% of an accelerator composition consisting essentially of a mixture of a butyraldehyde-monobutylamine condensation product, litharge and magnesium oxide, the remainder of said composition being an organic aromatic solvent.

8. An article of manufacture which comprises an object having a metallic surface and a coating covering a portion of said surface, said coating being inert to attack by acid and alkali, said coating being obtained by heat curing a maskant composition consisting essentially of about 14 to about 20% of non-copolymerized chloroprene polymer, about 10 to about 20% carbon black, about 1 to about 5% of a phenol-formaldehyde resin, about 0.12 to about 0.36% phenyl-alpha naphthyl amine as antioxidant, an accelerator composition consisting essentially of about 0.10 to about 0.40% of magnesium oxide, about 0.10 to about 0.30% butyraldehyde-monobutylamine condensation product and about 0.20 to about 0.60% litharge, the remainder of said maskant composition being an organic aromatic solvent.

References Cited in the file of this patent

UNITED STATES PATENTS

| | | |
|---|---|---|
| 2,145,412 | Winkelmann | Jan. 31, 1939 |
| 2,459,739 | Groten et al. | Jan. 18, 1949 |
| 2,532,374 | Shepard et al. | Dec. 5, 1950 |
| 2,610,910 | Thomson | Sept. 16, 1952 |
| 2,635,088 | Holmes | Apr. 14, 1953 |

OTHER REFERENCES

Whitby: "Synthetic Rubber," published by Wiley & Sons, Inc., New York (1954), page 767 relied upon.